ns Kuhle, Bergisch Gladbach;
United States Patent [19]

Widdig et al.

[11] 3,881,018

[45] Apr. 29, 1975

[54] SUBSTITUTED AMIDOPHENYLGUANIDINE FUNGICIDES

[75] Inventors: Arno Widdig, Blecher; Engelbert Kuhle, Bergisch Gladbach; Ferdinand Grewe, Burscheid; Helmut Kaspers, Leverkusen; Hans Scheinpflug, Leverkusen; Paul-Ernst Frohberger, Leverkusen, all of Germany

[73] Assignee: Bayer Aktiengesellschaft, Leverkusen, Germany

[22] Filed: Mar. 1, 1973

[21] Appl. No.: 337,183

Related U.S. Application Data

[63] Continuation-in-part of Ser. No. 83,159, Oct. 22, 1970.

[30] Foreign Application Priority Data

Nov. 6, 1969  Germany.......................... 1955749

[52] U.S. Cl.................. 424/300; 424/285; 424/286
[51] Int. Cl............................................. A01n 4/20
[58] Field of Search.......... 424/300, 286; 260/471 C

[56] References Cited
UNITED STATES PATENTS 3,564,041   2/1971   Farrissey et al.................... 260/471

*Primary Examiner*—Albert T. Meyers
*Assistant Examiner*—Leonard Scherkman
*Attorney, Agent, or Firm*—Burgess, Dinklage & Sprung

[57] ABSTRACT

Substituted amidophenylguanidines of the formula

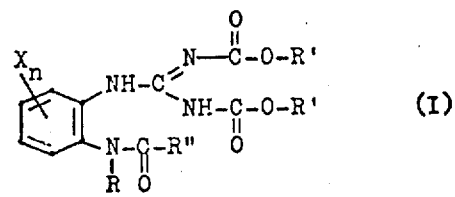

in which each X independently denotes a halogen atom, lower alkyl or lower alkoxy, $n$ denotes 0, 1 or 2, R denotes a hydrogen atom, or lower alkyl, R' denotes alkyl with 1–12 carbon atoms, and R'' denotes a hydrogen atom, alkyl with 1–18 carbon atoms, which may be substituted, cycloalkyl with 5–8 ring carbon atoms, aralkyl, which may be substituted, aryl, which may be substituted, or 2-furyl, which possess fungicidal properties.

10 Claims, No Drawings

SUBSTITUTED AMIDOPHENYLGUANIDINE FUNGICIDES

This application is a continuation-in-part of pending U.S. application Ser. No. 83,159, filed Oct. 22, 1970.

The present invention relates to and has for its objects the provision of particular new substituted amidophenylguanidines which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that certain guanidine derivatives can be used as fungicides, for example dodecylguanidine acetate (A) (see Belgian Patent Specification 568,612) which has attained a considerable importance in practice. The salts of phenylmercury, which are toxic to mammals, used hitherto in the cultivation of pip fruit for the control of scab (*Venturia inaequalis* and *Venturia pirina*), may be replaced by the salts of dodecylguanidine for the curative combating of many fungal diseases. However, the salts of dodecylguanidine are only very slightly effective against powdery mildew fungi from the Erysiphaceae family, such as the causative organism or powdery mildew of apples, *Podosphaera leucotricha*.

The present invention provides amidophenylguanidines of the general formula

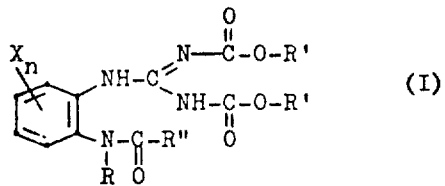

in which
each X independently denotes a halogen atom, lower alkyl or lower alkoxy,
n denotes 0, 1 or 2,
R denotes a hydrogen atom or lower alkyl,
R' denotes alkyl with 1–12 carbon atoms, and
R'' denotes a hydrogen atom, alkyl with 1–18 carbon atoms (which may be substituted by halogen, cyano, lower alkoxy, alkoxycarbonyl with 2–5 carbon atoms, phenoxy, halophenoxy, alkylphenoxy or alkoxyphenoxy), cycloalkyl with 5–8 ring carbon atoms, aralkyl (which may be sutstituted by halogen, lower alkyl or lower alkoxy), aryl (which may be substituted by halogen, lower alkyl or lower alkoxy) or 2-furyl.

The compounds of the formula (I) exhibit strong fungicidal properties.

The present invention also provides a process for the production of the amidophenylguanidines of the formula (I) in which a 2-aminoaniline derivative of the formula

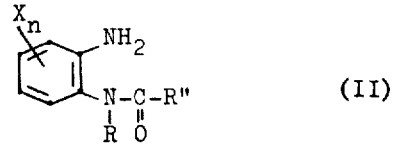

in which
X, n, R and R'' are the same as defined above, is reacted with an N,N'-bis-carboalkoxyisothiourea-S-alkyl ether of the formula

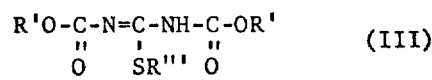

in which
R' is the same as defined above, and
R''' stands for alkyl of 1–4 carbon atoms in the presence of a diluent (which term includes a solvent).

It is surprising that the amidophenylguanidines according to the invention possess a higher fungicidal activity against powdery mildew fungi than dodecylguanidine acetate. Also interesting is the fact that compounds according to the invention also exhibit a genuine systemic effectiveness against some important fungus-parasitic diseases. Thus, for example, it is possible, by supplying the compounds via the roots of the host plants, to protect cucumbers from powdery mildew of cucumbers (*Erysiphe cichoracearum*), apples from apple scab (*Venturia inaequalis*) and powdery mildew of apples (*Podosphaera leucotricha*), and horse beans (*Vicia faba*) from *Botrytis cinerea*. The above-mentioned agents of the prior art do not possess such a systemic activity. Owing to their protective, curative and systemic fungicidal activity against a large number of phytopathogenic fungi from various systemic groups, their high compatibility with plants and low toxicity to warm-blooded animals, the compounds according to the invention represent a valuable enrichment of the art.

When 2-amino-4-methylacetanilide and N,N'-biscarbomethoxyisothiourea-S-methyl ether are used as starting materials, the reaction course can be represented by the following equation:

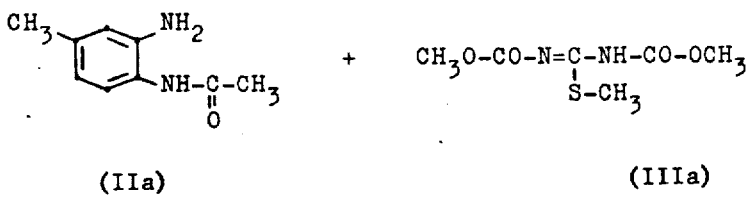

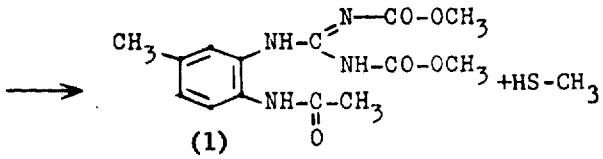

The 2-aminoaniline derivatives used as starting materials are defined by the formula (II). In this formula, as in formula (I), X stands preferably for chlorine, bromine, fluorine, alkyl or alkoxy with 1–4 carbon atoms, and especially chlorine, methyl, ethyl, isopropyl, methoxy, ethoxy or isopropoxy; n stands preferably for 0 or 1, R stands preferably for methyl, ethyl or especially hydrogen and R'' stands preferably for alkyl with 1–18 carbon atoms, p-methylphenyl, p-chlorophenyl, p-methoxyphenyl, heptadecyl, phenyl and especially methyl, propyl, undecyl, 1-furyl or phenoxymethyl. As examples of the 2-aminoaniline derivatives, there may be mentioned: 2-aminoacetoanilide, 2-amino-4-methylacetanilide, 2-aminobutyranilide, 2-aminolauranilide, 2-aminostearanilide, benzoic acid (2-amino-)-anilide, p-chlorobenzoic acid (2-amino)-anilide, phenoxyacetic acid (2-amino)-anilide, 2-furancarboxylic acid (2'-amino)-anilide, N-ethyl-N-acetyl-o-phenylenediamine, 2-amino-4-chloroacetanilide, and 2-amino-4-chloro-stearanilide.

The 2-amino-aniline derivatives used as starting materials are for the most part known (see Beilstein's Handbuch der organischen Chemie, Volume 13, pages 20–32, Berlin 1930; Volume 13, 1.Erganzungswerk (1st Supplement), pages 8–10, Berlin 1933; Volume 13, 2.Erganzungswerk (2nd Supplement), pages 14–23, Berlin-Gottingen-Heidelberg, 1950). They can also be obtained by reduction or catalytic hydrogenation of the appropriate nitro compounds.

The isothiourea ethers used as starting materials are defined by the formula (III). In this formula, as in formula (I), R' stands preferably for lower alkyl especially with 1–4 carbon atoms and most especially for methyl, ethyl or propyl. In formulae (I) and (III), the radicals R' may be the same or different. R''' stands preferably for methyl or ethyl. Some of the isothiourea ethers are known (see Olin and Dains, J., Amer. Chem. Soc. 52, 3326 (1930) and U.S. Patent 2,933,502); they can also be obtained from S-alkylisothiourea ethers and chloroformic acid alkyl esters in the presence of equivalent amounts of alkali.

As examples of the isothiourea ether, there may be mentioned:

N,N'-bis-carbomethoxy-isothiourea-S-methyl ether,
N,N'-bis -carbomethoxy-isothiourea-S-ethyl ether,
N,N'-bis-carboethoxy-isothiourea-S-methyl ether, and
N,N'-bis-carbopropoxy-isothiourea-S-methyl ether.

All polar organic solvents are suitable as the diluent in the process according to the invention. These include alcohols, such as methanol, ethanol, isopropanol; mixtures of alcohols with water; ketones, such as acetone, (optionally mixed with water); and ethers, such as dioxane or tetrahydrofuran.

The reaction temperatures can be varied within a fairly wide range. In general, the work is carried out at from between about 50° to 120°C, preferably from about 60° to 100°C.

When carrying out the process according to the invention, 1 mole of isothiourea ether is preferably used per mole of 2-aminoaniline derivative. Amounts greater or lesser by up to 20% are possible without substantial diminution of the yield. The reaction is preferably carried out in a boiling solvent, an alkylmercaptan being formed as a by-product. The end products are obtained in crystalline form when the reaction mixture is cooled, and can be separated by suction filtration and, optionally, purified by re-dissolving or re-crystallization.

The active compounds according to the invention exhibit a strong fungitoxic activity, In the concentrations necessary for the control of fungi, they do not damage cultivated plants, and have a low toxicity to warm-blooded animals. For these reasons, they are suitable as crop protection agents for the control of fungi. Fungitoxic agents in crop protection are used for the control of *Archimycetes*, -*Phycomycetes*, *Ascomycetes*, *Basidiomycetes* and *Fungi Imperfecti*.

The active compounds according to the invention have a very broad activity spectrum and can be applied against parasitic fungi which infect above-the-soil parts of plants or attack the plants from the soil, as well as against seedborne pathogenic agents.

They are particularly effective against fungi which cause powdery mildew diseases. To this group of fungi there belong predominantly representatives from the *Erysiphaceae* family with the most important genera being *Erysiphe*, *Uncinula* (*Oidium*), *Sphaerotheca* and *Podosphaera*. As important fungi, there may be mentioned *Erysiphe cichoracearum*, *Podosphaera leucotricha* and *Uncinula necator*.

The active compounds according to the invention also give good results in the control or rice diseases. Thus, they show an excellent activity against the fungi *Piricularia oryzae* and *Pellicularia sasakii*, by reason of which they can be used for joint control of these two diseases. This means a substantial advance, since up to now, agents of different chemical constitution were required against these two fungi. Surprisingly, the active compounds show not only a protective activity, but also a curative and systemic effect.

The compounds according to the invention, however, also act against other fungi which infect rice or other cultivated plants, such as *Cochliobolus myiabeanus*, *Mycosphaerella musicola*, *Cercospora personata*, *Botrytis cinerea*, *Alternaria species*, *Verticillium alboatrum*, *Phialophora cinerescens* and *Fusarium species* as well as against the bacterium *Xanthomonas oryzae*.

The active compounds according to the instant invention can be utilized, if desired in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known conpatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 2–90%, by weight of the mixture, whereas carrier composition mixtures suitable for direct application or field application generally contemplate those in which the active compound is present in an amount substantially between about 0.0001–10.0%, preferably 0.01–1.0%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is affective for the purpose in question and which is generally about 0.0001–95%, and preferably 0.01–95%, by weight of the mixture.

Generally, 0.0001–10% by weight concentrations of the active compound are sufficiently effective, although aqueous preparations having concentrations of 0.01–1% by weight of the active compound are normally used.

In the case of use as seed dressings, applied amounts of 0.1 to 10 g, preferably 0.2 to 2 g, of active compound per kg of seed are suitable.

In the case of use as soil treatment agents, applied amounts of 1 to 500 g, preferably 10 to 200 g, per cubic meter of soil are usually necessary.

The active compounds according to the invention show also an insecticidal and acaricidal activity as well as an activity against some mould fungi and yeasts. In concentrations higher than those necessary for fungicidal activity, the substances inhibit plant growth.

The active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95% by weight of the active compound, or even the 100% active substance alone, e.g. about 20–100% by weight of the active compound, In particular, the present invention contemplates methods of selectively killing, combating or controlling fungi, which comprises applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, watering, sprinkling pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following Examples.

EXAMPLE 1

Fusicladium test (apple scab) (Protective)

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are sprayed with the spray liquid until dripping wet. The plants remain in a greenhouse for 24 hours at 20°C. and at a relative atmospheric humidity of 70%. They are then inoculated with an aqueous conidium suspension of the apple scab causative organism (*Fusicladium dendriticum Fuckel*) and incubated for 18 hours in a humidity chamber at 18° – 20°C. and at a relative atmospheric humidity of 100%.

The plants are then placed in a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table 1:

TABLE 1

Fusicladium test / Protective

| Active Compound | Infection as a percentage of the infection of the untreated control with a concentration of active compound (in %) of 0.0062 |
|---|---|
| $C_{12}H_{25}NH-C(=NH)(NH_2) \cdot CH_3COOH$ (A) (known) | 25 |
| Compound (2) | 17 |
| Compound (6) | 9 |

EXAMPLE 2

Fusicladium test (apple scab) (Curative)

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are inoculated with an aqueous conidium suspension of the apple scab causative organism (*Fusicladium dendriticum Fuckel*) and incubated for 18 hours in a humidity chamber at 18°-20°C. and at an atmospheric humidity of 100%. The plants are then placed in a green house where they dry.

After standing for a suitable period of time, the plants are sprayed dripping wet with the spray liquid prepared in the manner described above. The plants are again placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The active compounds, the concentrations of the active compounds, the period of time between inoculation and spraying and the results obtained can be seen from the following Table 2.

TABLE 2

Fusicladium test/Curative

| Active compound | Residence period in hours 42 | Infection as a percentage of the infection of the untreated control with a concentration of active compound (in%) of 0.025 | 0.0062 |
|---|---|---|---|
| $C_{12}H_{25}NH-C(=NH)(NH_2) \cdot CH_3COOH$ (known) (A) | | 26 | 46 |

TABLE 2 — Continued

Fusicladium test/Curative

| Active compound | Residence period in hours 42 | Infection as a percentage of the infection of the untreated control with a concentration of active compound (in %) of 0.025 | 0.0062 |
|---|---|---|---|
| (2) structure with NH-C(=N-C(=O)-OCH₃)(NH-C(=O)-OCH₃) and NH-C(=O)-CH₃ on benzene ring | | 4 | 32 |
| (4) structure with NH-C(=N-C(=O)-OC₂H₅)(NH-C(=O)-OC₂H₅) and NH-C(=O)-C₃H₇ on benzene ring | | 4 | 35 |
| (6) structure with NH-C(=N-C(=O)-OCH₃)(NH-C(=O)-OCH₃) and NH-C(=O)-C₃H₇ on benzene ring | | 3 | 12 |
| (8) Cl-substituted benzene with NH-C(=N-C(=O)-OCH₃)(NH-C(=O)-OCH₃) and NH-C(=O)-CH₃ | | 13 | 17 |

EXAMPLE 3

Erysiphe test

Solvent: 4.7 parts by weight acetone
Emulsifier: 0.3 parts by weight alkylaryl polyglycol ether
Water: 95 parts by weight The amount of the active compound required for the desired concentration in the spray liquid is mixed with the stated amount of the solvent, and the concentrate is diluted with the stated amount of water containing the stated additions.

Yound cucumber plants (Delikatess variety) with about three foliage leaves are sprayed with the spray liquid until dripping wet. The cucumber plants remain in a greenhouse for 24 hours to dry. They are then, for the purpose of inoculation, dusted with conidia of the fungus *Erysiphe polyphaga*. The plants are subsequently placed in a greenhouse at 23°–24°C. and at a relative atmospheric humidity of about 75%.

After 12 days, the infestation of the cucumber plants is determined as a percentage of the untreated but also inoculated control plants. 0% means no infestation; 100% that the infestation is exactly as great as in the case of the control plants.

The active compounds, the concentrations of the active compounds and the results obtained can be seen from the following Table 3.

TABLE 3

Erysiphe Test

| Active compound | Infection as a percentage of the infection of the untreated control with a concentration of active compound (in %) of 0.0062 |
|---|---|
| $C_{12}H_{25}NH-C(=NH)(NH_2) \cdot CH_3COOH$ (known) (A) | 87 |
| Compound (2): 2-[NH-C(=N-CO-OCH$_3$)-NH-CO-OCH$_3$], NH-CO-CH$_3$ on phenyl | 77 |
| Compound (4): 2-[NH-C(=N-CO-OC$_2$H$_5$)-NH-CO-OC$_2$H$_5$], NH-CO-C$_3$H$_7$ on phenyl | 63 |
| Compound (6): 2-[NH-C(=N-CO-OCH$_3$)-NH-CO-OCH$_3$], NH-CO-C$_3$H$_7$ on phenyl | 47 |
| Compound (8): Cl, NH-C(=N-CO-OCH$_3$)-NH-CO-OCH$_3$, NH-CO-CH$_3$ on phenyl | 73 |

EXAMPLE 4

Fusicladium test (systemic)

Solvent: 4.7 parts by weight acetone
Emulsifier: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in 1 week with 20 cc of the liquid to be used for watering, in the stated concentration of active compound, with reference to 100 cc of soil. The plants so treated are, after the treatment, inoculated with an aqueous conidium suspension of *Fusicladium dendriticum Fuckel* and incubated for 18 hours in a humidity chamber at 18°–20°C and at a relative atmospheric humidity of 100%. The plants are then placed in a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from the following Table 4:

TABLE 4

Fusicladium test/systemic

| Active compound | Infection as a percentage of the infection of the untreated control with a concentration of active compound of | |
|---|---|---|
| | 30 ppm | 15 ppm |
| $C_{12}H_{25}NH-C\overset{NH}{\underset{NH_2}{\diagdown}} \cdot CH_3COOH$ (known) (A) | 100 | 100 |
| [structure (2): 2-acetamido phenyl with NH-C(=N-C(O)-OCH$_3$)(NH-C(O)-OCH$_3$)] | 0 | 0 |
| [structure (1): 5-methyl-2-acetamido phenyl with NH-C(=N-C(O)-OCH$_3$)(NH-C(O)-OCH$_3$)] | 4 | 23 |
| [structure (3): 5-ethoxy-2-acetamido phenyl with NH-C(=N-C(O)-OCH$_3$)(NH-C(O)-OCH$_3$)] | 7 | 39 |
| [structure (4): 2-butyramido phenyl with NH-C(=N-C(O)-OC$_2$H$_5$)(NH-C(O)-OC$_2$H$_5$)] | 7 | 35 |
| [structure (6): 2-butyramido phenyl with NH-C(=N-C(O)-OCH$_3$)(NH-C(O)-OCH$_3$)] | 0 | 0 |
| [structure (7): 2-(phenoxyacetamido) phenyl with NH-C(=N-C(O)-OCH$_3$)(NH-C(O)-OCH$_3$)] | 33 | - |

TABLE 4 (continued)

Fusicladium test/systemic

| Active compound | Infection as a percentage of the infection of the untreated control with a concentration of active compound of | |
|---|---|---|
| | 30 ppm | 15 ppm |
| 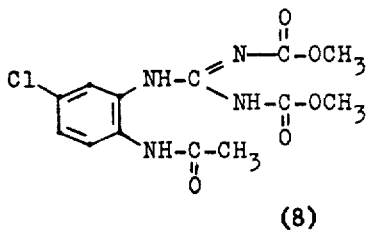 (8) | 2 | 17 |
| 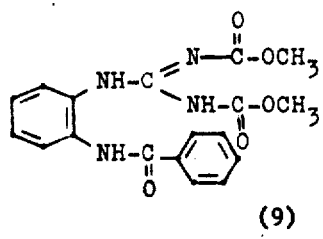 (9) | 7 | 42 |

EXAMPLE 5

Podosphaera test (systemic)

Solvent: 4.7 parts by weight acetone
Dispersing agent: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered, once in 1 week with 20 cc of the liquid to be used for watering, in the stated concentration of active compound, with reference to 100 cc of soil. The plants so treated are, after the treatment, inoculated with conidia of *Podosphaera leucotricha* Salm and placed in a greenhouse at a temperature of 21°–23°C and at a relative atmospheric humidity of about 70%. 10 days after the inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results obtained can be seen from the following Table 5:

TABLE 5

Podosphaera test/systemic

| Active compound | Infection as a percentage of the infection of the untreated control with a concentration of active compound of | |
|---|---|---|
| | 30 ppm | 15 ppm |
| 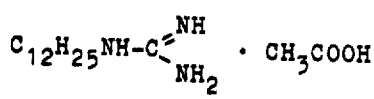 (known) (A) | 100 | 100 |

TABLE 5 (continued)

Podosphaera test/systemic

| Active compound | Infection as a percentage of the infection of the untreated control with a concentration of active compound of | |
|---|---|---|
| | 30 ppm | 15 ppm |
| (2) Structure: phenyl with NH-C(=N-C(=O)-OCH$_3$)(NH-C(=O)-OCH$_3$) and ortho NH-C(=O)-CH$_3$ | 0 | 0.5 |
| (1) Structure: 4-methylphenyl with NH-C(=N-C(=O)-OCH$_3$)(NH-C(=O)-OCH$_3$) and NH-C(=O)-CH$_3$ | 17 | 30 |
| (3) Structure: 4-ethoxyphenyl with NH-C(=N-C(=O)-OCH$_3$)(NH-C(=O)-OCH$_3$) and NH-C(=O)-CH$_3$ | 15 | 31 |
| (6) Structure: phenyl with NH-C(=N-C(=O)-OCH$_3$)(NH-C(=O)-OCH$_3$) and ortho NH-C(=O)-C$_3$H$_7$ | 4 | 5 |
| (9) Structure: phenyl with NH-C(=N-C(=O)-OCH$_3$)(NH-C(=O)-OCH$_3$) and ortho NH-C(=O)-phenyl | 41 | - |

EXAMPLE 6

Botrytis test (systemic)

Solvent: 4.7 parts by weight acetone
Dispersing agent: 0.3 parts by weight alkylaryl polyglycol ether
Water: 95 parts by weight.

The amount of active compound required for the desired concentration of the active compound in the liquid to be used for watering is mixed with the stated amount of solvent, and the concentrate is diluted with the stated amount of water which contains the stated additions.

Plants of Vicia faba grown in standard soil are, in the 1-2 leaf-pair stage, watered once in 1 week with 20 cc of the liquid to be used for watering, in the stated concentration of active compound, with reference to 100cc of soil.

After the treatment, the lower two leaf-pairs are removed and, in each case, placed in a Petri dish lined with moist filter paper. Small discs of filter paper of 1 cm diameter are then dipped into an aqueous conidium suspension of the grey mould causative organism *Botrytis cinerea* Pers. ex Fr. and laid on the leaves. After an incubation period of 48 hours in the closed dishes at 20°C, the necroses visible under the small discs are evaluated according to frequency of occurrence (evaluation scheme O – V). The evaluation values obtained are converted into percentage infection.

0% means no infection; 100% means that the infection is exactly as great as in the case of the control plants.

The active compounds, the concentrations of the active compounds and the results obtained can be seen from the following Table 6:

the concentrate is diluted with the stated amount of water containing the stated additives.

2 batches each consisting of 30 rice plants about 2–4 weeks old are sprayed with the spray liquor until dripping wet. The plants remain in a green house at temperatures of 22° to 24°C and a relative atmospheric humidity of about 70% until they are dry. One batch of the plants is then inoculated with an aqueous suspension of 100,000 to 200,000 spores/ml of *Piricularia oryzae* and placed in a chamber at 24°–26°C and 100% relative atmospheric humidity. The other batch of the plants is infected with a culture of *Pellicularia sasakii* grown on malt agar and placed at 28°–30°C and 100% relative atmospheric humidity.

5 to 8 days after inoculation, the infection of all the leaves present at the time of inoculation with *Piricularia oryzae* is determined as a percentage of the un-

TABLE 6

Botrytis test/systemic

| Active compound | Evaluation of leaf necroses O-V with the following concentrations of active compound in ppm |
|---|---|
| | 120 |
| $C_{12}H_{25}NH-C\begin{subarray}{l}\nearrow NH \\ \searrow NH_2\end{subarray} \cdot CH_3COOH$ (known) (A) | 100 |
| (structure with NH-C=N-C(O)-OCH$_3$, NH-C(O)-OCH$_3$, NH-C(O)-CH$_3$) (2) | 20 |
| (structure with NH-C=N-C(O)-OCH$_3$, NH-C(O)-OCH$_3$, NH-C(O)-C$_3$H$_7$) (6) | 18 |

EXAMPLE 7

Piricularia and Pellicularia test

Solvent: 4 parts by weight acetone
Dispersing agent: 0.05 parts by weight sodium oleate
Water: 95.75 parts by weight
Other additives: 0.2 parts by weight gelatin The amount of active compound required for the desired concentration of active compound in the spray liquor is mixed with the stated amount of solvent, and treated but also inoculated control plants. In the case of the plants infected with *Pellicularia sasakii*, the infection on the leaf sheaths after the same time is also determined in proportion to the untreated but infected control.

0% means no infection; 100% means that the infection is exactly as great in the case of the control plants.

The active compounds, the concentrations of the active compounds and the results obtained can be seen from the following Table 7:

TABLE 7

Piricularia(a) and Pellicularia(b) test pr: = protective cur. = curative

| Active compound | | | Infection as a percentage of the infection of the untreated control with a concentration of active compound (in %) of | | | |
|---|---|---|---|---|---|---|
| | | | (a) | | (b) | |
| | | | 0.05 | 0.025 | 0.05 | 0.025 |
| 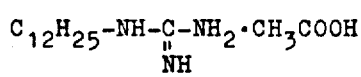 (known) | (A) | pr. 100 cur. 100 | 100 | | 100 | |
| 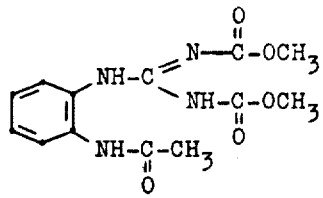 | (2) | pr. 0 | | | | |
| 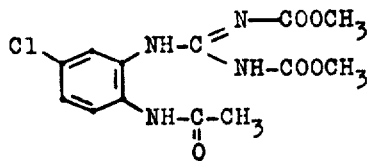 | (8) | pr. 0 cur. 13 | | | 0 | |

EXAMPLE 8

Agar plate test

Test for fungitoxic effectiveness and breadth of the activity spectrum.
 Solvent: acetone
 Parts by weight: a. 1000
 b. 100

To produce a suitable preparation of the active compound, 1 part by weight of the active compound is taken up in the stated amount of solvent.

The preparation of the active compound is added to potato dextrose agar (which has been liquefied by heating) in such an amount that the desired concentration of active compound is incorporated therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. O means no mycelium growth, either on the treated substrate or on the inoculum, the symbol - means mycelium growth on the inoculum only no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 8:

Table 8

Agar plate test

| Active compound | Concentration of active compound in substrate in ppm | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|
| untreated | - | + | + | + | + | + | + | + | + |
| (B) $CH_2-NH-CS-S\diagdown$<br>$\phantom{CH_2-NH-CS-}Zn$<br>$CH_2-NH-CS-S\diagup$<br>(known) | 10<br>100 | +<br>+ | +<br>+ | +<br>+ | +<br>0 | <br> | +<br>+ | +<br>+ | +<br>+ |
| (2) 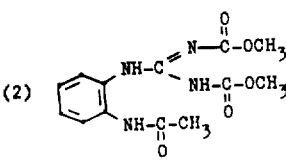 | 100 | + | 0 | - | 0 | + | 0 | 0 | + |
| (4) 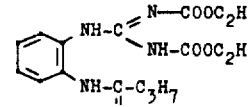 | 100 | + | 0 | + | 0 | + | 0 | 0 | + |

EXAMPLE 9

Seed dressing test/bunt of wheat (seed-born mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of Tilletia caries per kg of seed. To apply the dressing, the seen is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 9:

Table 9

Seed dressing test/bunt of wheat

| Active compound | Concentration of active compound in the dressing in % | Applied amount dressing in g/kg seed | Spore Germination in % |
|---|---|---|---|
| non-dressed | - | - | >10 |
| (B) $CH_2-NH-CS-S\diagdown$<br>$\phantom{CH_2-NH-CS-}Zn$<br>$CH_2-NH-CS-S\diagup$<br>(known) | 10 | 1 | 5 |

Table 9 (continued)

Seed dressing test/bunt of wheat

| Active compound | Concentration of active compound in the dressing in % | Applied amount dressing in g/kg seed | Spore Germination in % |
|---|---|---|---|
| (2) 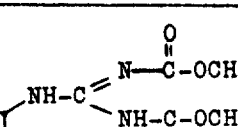 | 30<br>10 | 1<br>1 | 0.000<br>0.5 |
| (4) 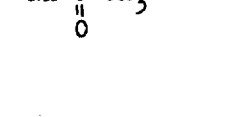 | 30 | 1 | 0.05 |

EXAMPLE 10

Soil treating agent test/soil-born mycoses

To produce a suitable preparation of the active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into five pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown; 100% means that healthy plants have resulted from all the seeds.

The active compounds, the concentration of the active compounds in the soil, the test fungi, host plants, greenhouse temperatures and the results obtained can be seen from the following Table 10:

Table 10

Soil treating agent test/soil-born mycoses

| | | Number of healthy plants |
|---|---|---|
| Test fungi: | Fusarium culmorum | (in %) |
| Host plant: | Pea | |
| Temperature range: | 22 - 25°C | |

| Active compounds | Concentration of active compound in mg/liter soil | |
|---|---|---|
| Fruhstorfer standard soil, sterilized untreated | - | 96 |

Table 10 (continued)

Soil treating agent test/soil-born mycoses

Test fungi: Fusarium culmorum
Host plant: Pea
Temperature range: 22 - 25°C

Number of healthy plants (in %)

| Active compounds | Concentration of active compound in mg/liter soil | |
|---|---|---|
| Fruhstorfer standard soil, sterilized and inoculated untreated | - | 10 |
| (A) $C_{12}H_{25}NH-C\begin{smallmatrix}NH\\\\NH_2\end{smallmatrix} \cdot CH_3COOH$ (known) | 50<br>100<br>200 | 12<br>4<br>14 |
| (2) 2-NH-C(=N-CO-OCH$_3$)(NH-CO-OCH$_3$), 1-NH-CO-CH$_3$ phenyl | 100 | 75 |
| (11) 2-NH-C(=N-COOC$_3$H$_7$)(NH-COOC$_3$H$_7$), 1-NH-CO-CH$_3$ phenyl | 100 | 85 |

The following further examples are set forth to illustrate, without limitation, the process for producing the active compounds according to the present invention.

EXAMPLE 11

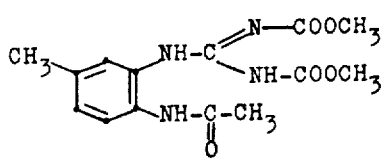

(1)

63 g (0.3 mole) of N,N'-bis-carbomethoxyisothioureaS-methyl ether and 49.2 g (0.3 mole) of 3-amino-4-acetamidotoluene are boiled together for 4 hours in 300 ml of alcohol. The solution is filtered while hot. During cooling, 50 g of N-(2-acetamido-5-methylphenyl)-N', N''-bis-methoxycarbonylguanidine having the melting point of 165°–167°C separate. The yield is 57% of the theory.

In analogous manner, the following compounds are obtained:

| Example | Formula | Melting point (°C) |
|---|---|---|
| (2) | 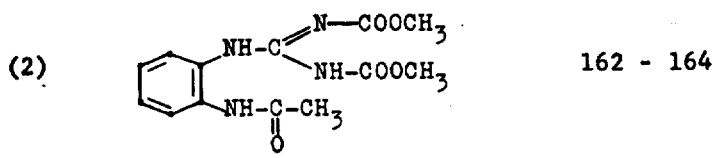 | 162 - 164 |
| (3) | 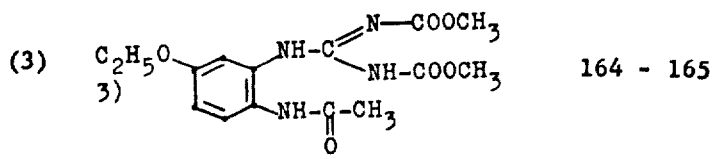 | 164 - 165 |
| (4) | 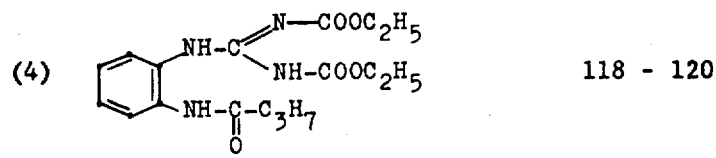 | 118 - 120 |
| (5) | 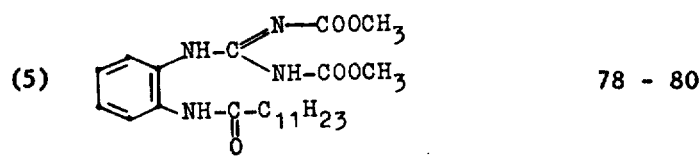 | 78 - 80 |
| (6) | 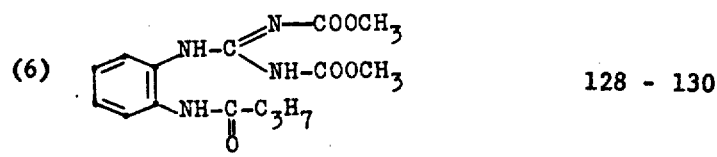 | 128 - 130 |
| (7) | 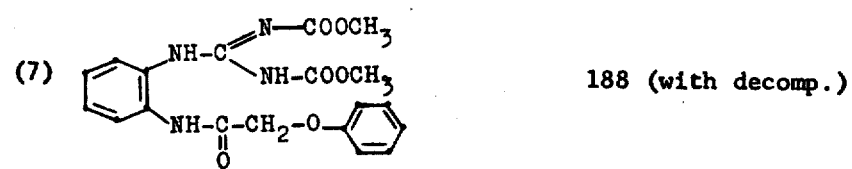 | 188 (with decomp.) |
| (8) | 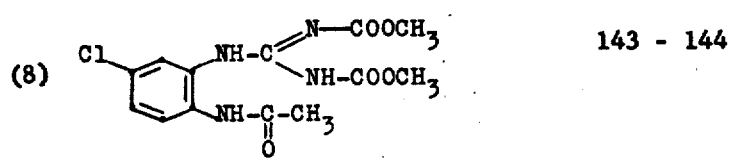 | 143 - 144 |
| (9) | 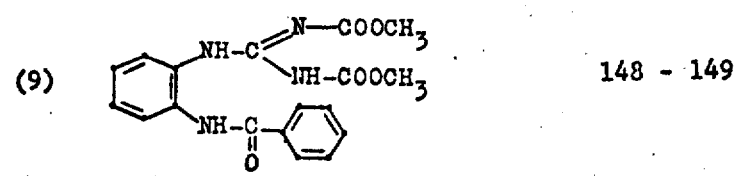 | 148 - 149 |

| Example | Formula | Melting point (°C) |
|---|---|---|
| (10) | 2-(NH-C(=N-COOCH₃)(NH-COOCH₃))-C₆H₄-NH-CO-(2-furyl) | 153 – 154 |
| (11) | 2-(NH-C(=N-COOC₃H₇)(NH-COOC₃H₇))-C₆H₄-NH-CO-CH₃ | 138 |
| (12) | 2-(NH-C(=N-COOCH₃)(NH-COOCH₃))-C₆H₄-NH-CO-C₂H₅ | 140–141 |
| (13) | 2-(NH-C(=N-COOCH₃)(NH-COOCH₃))-C₆H₄-NH-CO-CH₂-CH(CH₃)₂ | 144–145 |
| (14) | 2-(NH-C(=N-COOCH₃)(NH-COOCH₃))-C₆H₄-NH-CO-CH(CH₃)₂ | 152–154 |
| (15) | 2-(NH-C(=N-COOCH₃)(NH-COOCH₃))-C₆H₄-NH-CO-(cyclohexyl) | 178 |
| (16) | 2-(NH-C(=N-COOCH₃)(NH-COOCH₃))-C₆H₄-NH-CO-C(CH₃)₃ | 125–127 |

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and

What is claimed is:

1. A fungicidal composition comprising a fungicidally effective amount of a compound of the formula

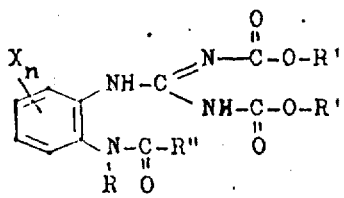

in which
each X independently is halogen lower alkyl or lower alkoxy,
n is 0, 1 or 2,
R is hydrogen or lower alkyl,
R' is alkyl of 1–12 carbon atoms, and
R'' is hydrogen; alkyl of 1–18 carbon atoms; alkyl of 1–18 carbon atoms substituted by lower alkoxy, alkoxycarbonyl of 2–5 carbon atoms or phenoxy; cycloalkyl of 5–8 ring carbon atoms; phenyl; or phenyl substituted by halogen, lower alkyl or lower alkoxy,
in admixture with a carrier.

2. The composition of claim 1 in which R'' is alkyl of 1–18 carbon atoms; alkyl of 1–18 carbon atoms substituted by alkoxy of 1–4 carbon atoms, alkoxycarbonyl of 2–5 carbon atoms or phenoxy; cycloalkyl of 5–8 ring carbon atoms; phenyl; or phenyl substituted by halogen, alkyl of 1–4 carbon atoms or alkoxy of 1–4 carbon atoms.

3. The composition of claim 1 in which X is chlorine, bromine, fluorine, alkyl of 1–4 carbon atoms or alkoxy of 1–4 carbon atoms; n is 0 or 1, R is hydrogen, methyl or ethyl; R' is alkyl of 1–4 carbon atoms; and R'' is alkyl of 1–18 carbon atoms, phenyl, p-chlorophenyl, p-methylphenyl, p-methoxyphenyl or phenoxymethyl.

4. The composition of claim 1 in which X is chlorine, methyl or ethoxy; n is 0 or 1; R is hydrogen; R' is methyl, ethyl or n-propyl; and R'' is methyl, n-propyl, n-undecyl, phenyl or phenoxy-methyl.

5. The composition of claim 1 wherein the compound is N-(2-acetamidophenyl)-N', N''-bis-methoxycarbonylguanidine of the formula

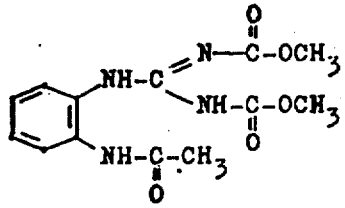

6. The composition of claim 1 wherein the compound is N-(2-butyramidophenyl) -N', N''-bis-ethoxycarbonylguanidine of the formula

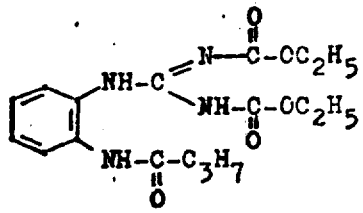

7. The composition of claim 1 wherein the compound is N-(2-butyramidophenyl)-N')-N', N''-bis-methoxycarbonylguanidine of the formula

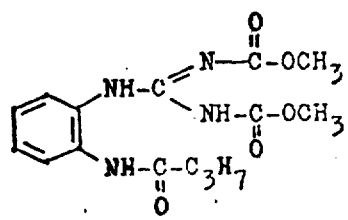

8. The composition of claim 1, wherein the compound is N-(2-propionamidophenyl)-N', N''-bis-methoxycarbonylguanidine of the formula

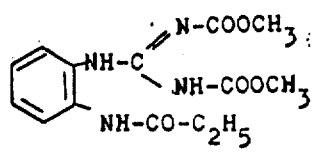

9. A method of combating fungi which comprises applying to the fungi or to a fungus habitat a fungicidally effective amount of a compound of the formula

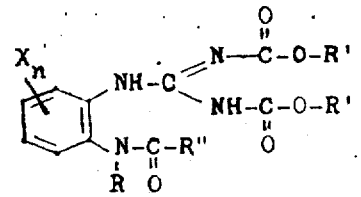

in which
each X independently is halogen, lower alkyl or lower alkoxy,
n is 0, 1 or 2,
R is hydrogen or lower alkyl,
R' is alkyl of 1–12 carbon atoms, and
R'' is hydrogen; alkyl of 1–18 carbon atoms; alkyl of 1–18 carbon atoms substituted by lower alkoxy, alkoxycarbonyl of 2–5 carbon atoms or phenoxy; cycloalkyl of 5–8 ring carbon atoms; phenyl; or phenyl substituted by halogen, lower alkyl or lower alkoxy.

10. The method of claim 9 in which the compound is selected from the group consisting of:
N-(2-acetamidophenyl)-N',N''-bis-methoxycarbonylguanidine,
N-(2-butyramidophenyl)-N',N''-bis-ethoxycarbonylguanidine,
N-(2-butyramidophenyl)-N',N''-bis-methoxycarbonylguanidine and
N-(2-propionamidophenyl)-N',N''-bis-methoxycarbonylguanidine.

* * * * *